(12) United States Patent
Koning et al.

(10) Patent No.: US 6,988,226 B2
(45) Date of Patent: Jan. 17, 2006

(54) HEALTH MONITORING SYSTEM FOR A PARTITIONED ARCHITECTURE

(75) Inventors: Maarten Koning, Bloomfield (CA); Kevin McCombe, Ottawa (CA); Vincent Hue, Vannes (FR); Remi Cote, Hull (CA); Thierry Preyssler, Oakland, CA (US); Andrew Gaiarsa, Carp (CA)

(73) Assignee: Wind River Systems, Inc., Alameda, CA (US)

( * ) Notice: Subject to any disclaimer, the term of this patent is extended or adjusted under 35 U.S.C. 154(b) by 559 days.

(21) Appl. No.: 10/273,288

(22) Filed: Oct. 17, 2002

(65) Prior Publication Data

US 2004/0078562 A1 Apr. 22, 2004

(51) Int. Cl.
*G06F 11/00* (2006.01)
(52) U.S. Cl. .......................... 714/57; 719/318
(58) Field of Classification Search ................ 714/57; 719/318, 319
See application file for complete search history.

(56) References Cited

U.S. PATENT DOCUMENTS

| 5,845,129 | A * | 12/1998 | Wendorf et al. ............ 710/200 |
| 6,604,123 | B1 * | 8/2003 | Bruno et al. ................ 718/100 |
| 6,701,464 | B2 * | 3/2004 | Austen et al. ................ 714/48 |
| 6,845,506 | B1 * | 1/2005 | Bharadhwaj ................ 718/108 |
| 2003/0009711 | A1 * | 1/2003 | Kuhn et al. ................... 714/57 |
| 2003/0037092 | A1 * | 2/2003 | McCarthy et al. .......... 709/104 |

* cited by examiner

*Primary Examiner*—Scott Baderman
(74) *Attorney, Agent, or Firm*—Davidson, Davidson & Kappel, LLC

(57) ABSTRACT

A computer system and method for operating a computer system is provided which comprises a core operating system and a system space having a number of memory locations. The core operating system is arranged to create a number of protection domains to partition the system space into a core operating system space and a plurality of partitions. A partition operating system, a partition user application, and a partition alarm handler is provided in each partition. Each partition operating system provides resource allocation services to the respective partition user application within the partition. An alarm dispatcher and a system alarm handler is provided in the core operating system space. The alarm dispatcher is configured to receive alarms and to dispatch the alarms to one of the alarm handlers.

38 Claims, 8 Drawing Sheets

HEALTH MONITORING SYSTEM FOR A PARTITIONED ARCHITECTURE

CROSS REFERENCE TO RELATED APPLICATIONS:

This application is related to U.S. application Ser. No. 10/273,333, entitled A TWO-LEVEL OPERATING SYSTEM ARCHITECTURE and U.S. application Ser. No. 10/273,305, entitled INTERPARTITION COMMUNICATION, both filed on even date herewith, and the entire disclosures of which are hereby incorporated by reference in their entirety.

BACKGROUND INFORMATION

A computing environment comprising, for example, a CPU, memory and Input/Output (I/O) devices, typically includes an operating system to provide a way to control the allocation of the resources of the environment. Traditional multitasking operating systems (e.g., UNIX, Windows) have been implemented in computing environments to provide a way to allocate the resources of the computing environment among various user programs or applications that may be running simultaneously in the computing environment. The operating system itself comprises a number of functions (executable code) and data structures that may be used to implement the resource allocation services of the operating system.

Certain operating systems, called "real-time operating systems," have been developed to provide a more controlled environment for the execution of application programs. Real-time operating systems are designed to be "deterministic" in their behavior—i.e., responses to events can be expected to occur within a known time of the occurrence of the event, without fail. Determinism is particularly necessary in "mission-critical" and "safety-critical" applications, where the outcome of event responses is essential to proper system function. Real-time operating systems are therefore implemented to execute as efficiently as possible with a minimum of overhead. As a result, prior real-time operating systems have typically employed relatively simplistic protection models for system and user processes—typically all processes execute in the same space, thus allowing direct access to all system resources by all user tasks (system calls can be made directly). This real time operating system model provides the fastest execution speed, but is deficient in providing system protection.

In order to improve system protection, it has been proposed to provide an operating system that implements a "protection domain" architecture. VxWorks® AE, marketed by Wind River Systems of Alameda, Calif., is an example of such a protection domain system. Basically, the protection domain system segregates the computing environment into a number of "protection domains." Each protection domain is a "container" for system resources, executable code and data structures, as well as for executing tasks and system objects (such as semaphores and message queues). Each resource and object in the system is "owned" by exactly one protection domain. The protection domain itself is a self-contained entity, and may be isolated from other system resources and objects to prevent tasks executing in the protection domain from potentially interfering with resources and objects owned by other protection domains (and vice versa).

The protection domain system of VxWorks® AE also, however, provides mechanisms by which tasks executing in one protection domain may access resources and objects contained in a separate protection domain. Each protection domain includes a "protection view" that defines the system resources and objects to which it has access (i.e., the resources and objects which it can "see"). By default, each protection domain has a protection view that includes only the system resources and objects contained within that protection domain. However, a protection domain may acquire access to the resources of other protection domains by "attaching" to these protection domains. When a first protection domain has obtained "unprotected attachment" to a second protection domain, the second protection domain is added to the protection view of the first protection domain. Executable code in the first protection domain may use "unprotected links" to functions selected in the second protection domain, allowing tasks executing in the first protection domain to use the resources and access the objects of the second protection domain with a minimum of execution overhead.

Unrestricted access by all tasks executing in one protection domain to all the resources and objects of another protection domain may not be desirable, however, for reasons of system protection and security. The VxWorks® AE protection domain system therefore provides a further mechanism whereby individual tasks executing in a first protection domain may access resources or objects contained in a second protection domain, but without adding the second protection domain to the protection view of the first protection domain. This access is achieved by "protected attachment" of the first protection domain to the second protection domain via a "protected link" between executable code in the first protection domain and selected functions in the second protection domain. Using the protected link, a task running in the first protection domain may, for example, make a direct function call to a function existing in the second protection domain, without the need to alter the protection view of the first protection domain. Tasks in the first protection domain are prevented from accessing the second protection domain except through this protected link, thus preventing unauthorized accesses of functions and data in the second protection domain. Protected linking can be achieved without the need to use different code instructions for protected and unprotected accesses (increasing implementation flexibility), and without the need to create separate tasks in the protected protection domain to perform the desired actions.

Such a protection domain system allows the operating system to dynamically allocate system resources among processes and flexibly implements and enforces a protection scheme. This protection scheme can be formulated to control the impact of poorly written applications, erroneous or disruptive application behavior, or other malfunctioning code, on the operating system and other applications running in the computer system. The protection domain approach accomplishes the protection results in a manner that is transparent to application developers, and incurs minimal execution overhead.

SUMMARY

In accordance with a first embodiment of the present invention, a computer system and a method for generating and responding to alarms in a computer system is provided. A plurality of protection domains is provided in a system space including a system protection domain and a plurality of partition protection domains, the system protection domain including core operating system, each partition protection domain providing a spatial and temporal partition including a partition operating system and a partition user application. The method further includes generating an alarm in one of the partition protection domains; transmitting the alarm to the core operating system via the partition operating system in said one of the partitions; accessing an alarm dispatcher in the system protection domain via the core operating system; and determining, via the alarm dispatcher, an alarm level of the alarm, wherein the alarm level is one of a system alarm level and a partition alarm level. If the alarm level is the system alarm level, the alarm dispatcher dispatches the alarm to a system alarm handler in the system protection domain. If the alarm level is the partition alarm level, the method dispatches the alarm to a partition alarm handler in said one of the partitions.

In accordance with a second embodiment of the present invention, the computer system and method of the first embodiment further includes a process alarm level, and if the alarm level is the process alarm level, the alarm dispatcher dispatches the alarm to a process alarm handler in said one of the partitions via the core operating system and the partition operating system in said one of the partitions.

In accordance with a third embodiment of the present invention, a computer system and method for operating a computer system is provided. A system space is provided having a number of memory locations, the system space including a plurality of partitions and an operating system space. A partition user application is implemented in each partition, whereby the partition user applications are spatially partitioned from each other and an operating system schedules the partitions such that the partition user applications are temporally partitioned from each other. A partition alarm handler is implemented in each partition and a system alarm handler is implemented in the core operating system space. An alarm dispatcher is implemented in the operating system space that receives alarms and dispatches the alarms to one of the alarm handlers. If a first alarm is dispatched to one of the partition alarm handlers and said one of the partition alarm handlers is unable to clear the first alarm, said one of the partition alarm handlers generates a second alarm, and transmits the second alarm to the alarm dispatcher. The alarm dispatcher receives the second alarm and dispatches the second alarm to an alarm handler other than said one of the partition alarm handlers.

In accordance with a fourth embodiment of the present invention, a computer system and method for operating a computer system is provided which comprises a core operating system and a system space having a number of memory locations. The core operating system is arranged to create a number of protection domains to partition the system space into a core operating system space and a plurality of partitions. A partition operating system, a partition user application, and a partition alarm handler is provided in each partition. Each partition operating system provides resource allocation services to the respective partition user application within the partition. An alarm dispatcher and a system alarm handler is provided in the core operating system space. The alarm dispatcher is configured to receive alarms and to dispatch the alarms to one of the alarm handlers.

In accordance with a fifth embodiment of the present invention, a computer system and method for operating a computer system is provided which comprises a core operating system and a system space having a number of memory locations. The core operating system is arranged to create a number of protection domains to partition the system space into a core operating system space and a plurality of partitions. A partition operating system and a partition user application pair is provided in each partition, whereby the partition operating system, partition user application pairs of the partitions are spatially partitioned from each other. Each partition operating system of each pair provides resource allocation services to the respective partition user application within the partition, and the core operating system time multiplexes the partitions such that the partition operating system, partition user application pairs are temporally partitioned from each other. A partition alarm handler is provided in each partition and an alarm dispatcher and a system alarm handler are provided in the core operating system space. The alarm dispatcher configured to receive alarms and to dispatch the alarms to one of the alarm handlers.

In accordance with a sixth embodiment of the present invention, a computer system and method for operating a computer system is provided which comprises a core operating system and a system space having a number of memory locations. The core operating system is arranged to partition the system space into a core operating system space and a plurality of partitions. A partition operating system and a partition user application pair is provided in each partition, whereby the partition operating system, partition user application pairs of the partitions are spatially partitioned from each other. Each partition operating system of each pair provides resource allocation services to the respective partition user application within the partition, and the core operating system time multiplexes the partitions such that the partition operating system, partition user application pairs are temporally partitioned from each other. A partition alarm handler is provided in each partition and an alarm dispatcher and a system alarm handler are provided in the core operating system space. The alarm dispatcher configured to receive alarms and to dispatch the alarms to one of the alarm handlers.

In with accordance with further embodiments of the present invention, computer readable media are provided, having stored thereon, computer executable process steps operable to control a computer to implement the embodiments described above.

DETAILED DESCRIPTION OF THE PREFERRED EMBODIMENTS

Figure 1:
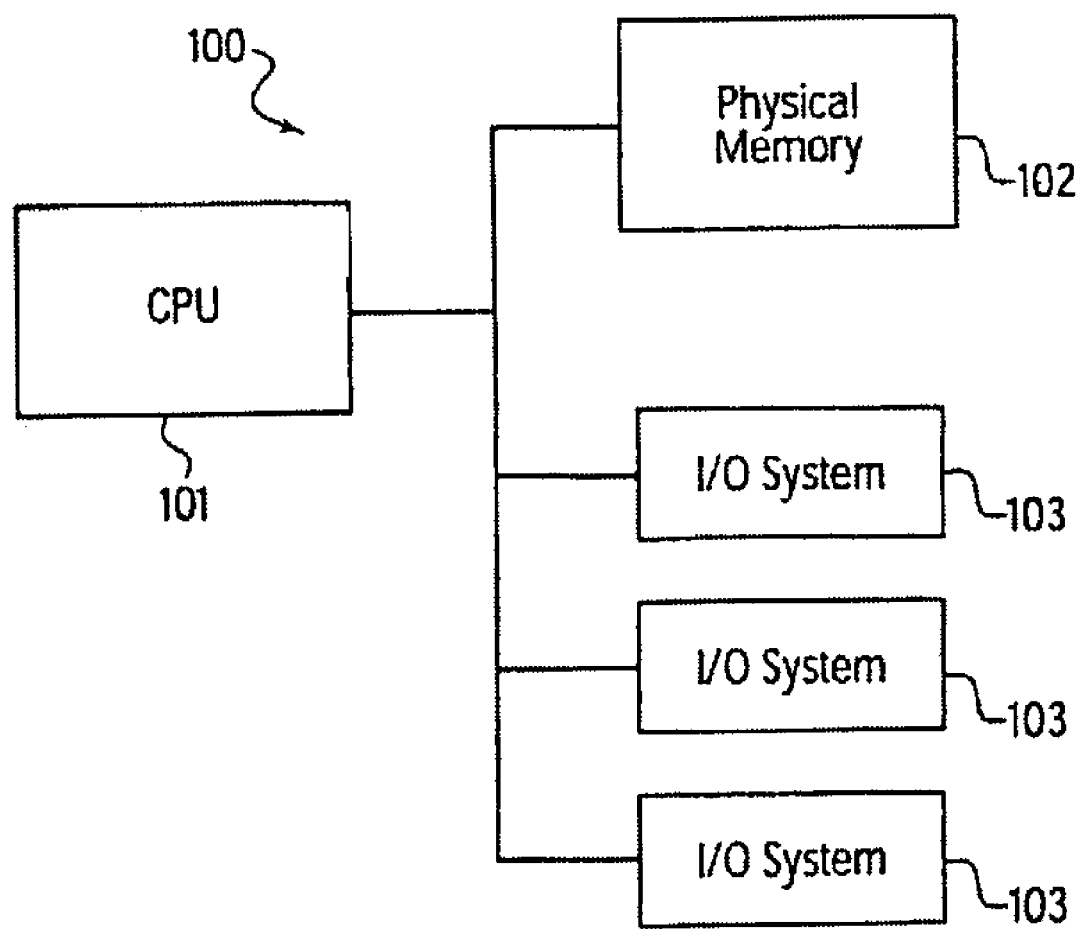
FIG. 1 shows a block diagram of an exemplary computer system implementing a two-level operating system architecture according to the present invention.

While the known protection domain system achieves a significant advance in system protection, additional capabilities would be desirable. For example, in safety-critical applications, it would be desirable to separate user applications into discrete partitions so that the impact of any erroneous or disruptive behavior of a particular user application can be contained to the malfunctioning application itself. It is also desirable to provide a health monitoring system in such a partitioned environment, which allows the system to respond to faults generated in the system.

In accordance with an embodiment of the present invention, a computer system is provided which includes a core operating system and a system space having a number of memory locations. The core operating system is arranged to create a number of protection domains to partition the system space into a core operating system space and a plurality of partitions. The partitions are spaced apart spatially and temporally. Each partition includes a partition user application, a partition alarm handler, and preferably, a partition operating system. In this regard, for purposes of the present application, a partition alarm handler is defined as located "in" a partition if it either: i) is physically located in the partition (making it spatially and temporally separated from other partitions and spatially separated from the core operating system space) or ii) is physically located in the core operating system space, but is executable only during the temporal partition of the partition (making it spatially and temporally separated from other partitions, but not spatially separated from the core operating system space). When provided, the partition operating system provides resource allocation services to the respective partition user application within the partition. A process alarm handler may also be provided in some or all of the partitions. Preferably an OS abstraction layer provides an interface between the core operating system and each partition operating system.

The system may include an alarm dispatcher and a system alarm handler in the core operating system space. The alarm dispatcher is configured to receive alarms and to dispatch the alarms to one of the alarm handlers (e.g., the system alarm handler, one of the partition alarm handlers or one of the process alarm handlers). When an alarm is generated in one of the partitions, the alarm is transmitted to the core operating system utilizing said one of the partition's partition operating system. The alarm dispatcher, in turn, receives the alarm utilizing the core operating system.

The alarm dispatcher then determines an alarm level of the alarm, wherein the alarm level is one of a system level alarm, a partition level alarm, and a process level alarm. If the alarm level is the system alarm level, the alarm dispatcher dispatches the alarm to the system alarm handler. If the alarm level is the partition alarm level, the alarm dispatcher dispatches the alarm to a partition alarm handler in said one of the partitions. If the alarm level is the process alarm level, the alarm handler dispatches the alarm to a process alarm handler in said one of the partitions via the core operating system and the partition operating system in said one of the partitions.

In certain embodiments of the present invention, the alarm can be one of a plurality of alarm types, and includes an alarm code that identifies its corresponding alarm type. In these embodiments, the alarm dispatcher includes a system dispatcher table associating each alarm code with one of the three alarm levels. Preferably, the system dispatcher table is editable by a system integrator.

In certain embodiments, the partition alarm handler is comprised of a partition table which references a plurality of partition alarm handlers. In this regard, the partition table may include, for each of the alarm codes corresponding to the partition alarm level, a corresponding partition alarm handler in the partition. The system level alarm handler may similarly be comprised of a system table which references a plurality of system alarm handlers in the core operating system space.

In one embodiment of the present invention, if an alarm is dispatched to one of the alarm handlers and the alarm handler is unable to clear the alarm, the alarm handler returns an error to the alarm dispatcher. The alarm dispatcher receives the second alarm utilizing the core operating system, and then dispatches a new alarm. Alternatively, if an alarm is dispatched to an alarm hander and the alarm handler is unable to clear the alarm, the alarm handler can generate a new alarm, and transmit the new alarm to the alarm dispatcher. The alarm dispatcher would then receive the new alarm utilizing the core operating system, and dispatch the new alarm to the appropriate handler. In any event, the new alarm preferably has a different alarm code than the original alarm, and the sub-code of the new alarm is set to the alarm code of the original alarm.

In certain embodiments of the present invention, a notification software agent is implemented in the system protection domain. The notification software agent maintains, for each registered one of the plurality of partitions, one or more alarm types of which the registered partition desires notification. Upon receiving notification of an alarm, the notification software agent notifies each partition registered for the alarm type of the received alarm. Preferably, the notification software agent receives notification of the alarm from one of the partition alarm handler and the system alarm handler.

In certain embodiments, a partition can designate which other partitions it will accept notification from. This can be used, for example, to prevent a critical partition from being flooded by notifications from less critical partitions.

Referring now to the drawings, and initially to FIG. 1, there is illustrated in block diagram form, a computer system 100 comprising a CPU 101, which is coupled to a physical memory system 102 and a number of I/O systems 103. Connection of the CPU 101 to the physical memory system 102 and the number of I/O systems 103 may be according to any of the well known system architectures (e.g., PCI bus) and may include additional systems in order to achieve connectivity. I/O systems 103 may comprise any of the well known input or output systems used in electronic devices (e.g., key pad, display, pointing device, modem, network connection). Physical memory system 102 may include RAM or other memory storage systems, and read only memory and/or other non-volatile storage systems for storage of software (an operating system, other applications) to be executed in the computer system 100. Alternately, software may be stored externally of computer system 100 and accessed from one of the I/O systems 103 (e.g., via a network connection). CPU 101 may also include a memory management unit (MMU, not shown) for implementing virtual memory mapping, caching, privilege checking and other memory management functions, as is also well known.

Figure 2:
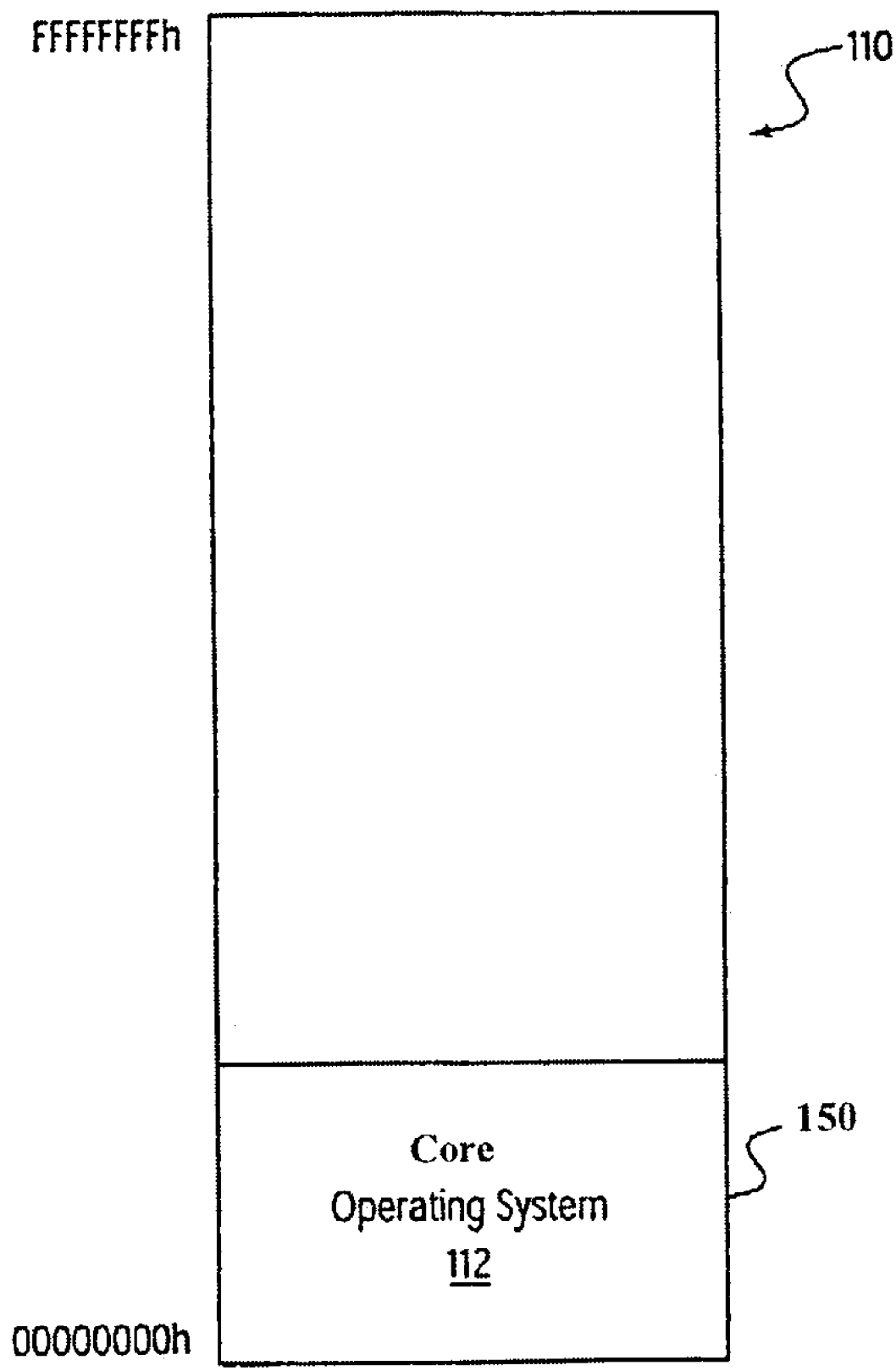
FIG. 2 shows an exemplary system space of the computer system of FIG. 1.

FIG. 2 illustrates an exemplary system space 110 of the computer system 100. System space 110 is, for example, an addressable virtual memory space available in the computer system 100. The system space 110 may be equal to or greater than the memory capacity of the physical memory 102 of the computer system 100, depending on system memory management implementations, as are well known. System space 110 may also include memory locations assigned as "memory mapped I/O" locations, allowing I/O operations through the system space 110. As shown in FIG. 2, the system space 110 includes addressable locations from 00000000h (hexadecimal) to FFFFFFFFh, defining a 32-bit addressable space. In this example, the system space 110 is implemented as a "flat" address space: each address corresponds to a unique virtual memory location for all objects in the system space 110 regardless of the object's owner. Other known addressing methods may also be used.

According to the present invention, the system space 110 stores a core operating system 112, such as, for example the VxWorks® AE operating system. The core operating system 112 includes executable code and data structures, as well as a number executing tasks and system objects that perform system control functions, as will be described in more detail below. Pursuant to the present invention, the core operating system 112 implements a protection domain system in which all resources and objects are contained within protection domains. The core operating system itself can be contained in a protection domain 150. The exemplary protection domain system of the core operating system 112 is also object oriented, and each protection domain is a system object.

By way of background, operating systems implemented in an "object oriented" manner are designed such that when a particular function and/or data structure (defined by a "class" definition) is requested, the operating system creates ("instantiates") an "object" that uses executable code and/or data structure definitions specified in the class definition. Such objects thus may contain executable code, data structures, or both. Objects that perform actions are typically referred to as "tasks", "threads", or "processes" (which may include tasks or threads)—they may all be referred to generally as executable entities, but will be referred to herein simply as tasks for purposes of clarity. Upon loading and execution of an operating system into the computing environment, system tasks and processes will be created in order to support the resource allocation needs of the system. User applications likewise upon execution may cause the creation of tasks ("user tasks") and other objects in order to perform the actions desired from the application.

The structure of each protection domain is defined through a protection domain "class" definition. A protection domain may be created, for example, by instantiating a protection domain object based on the protection domain class. Only the core operating system 112 can create or modify (or destroy) a protection domain, although user tasks can request such actions through a protection domain application programming interface (API) provided by the core operating system. A protection domain object is owned by the protection domain that requested its creation.

Figure 3:
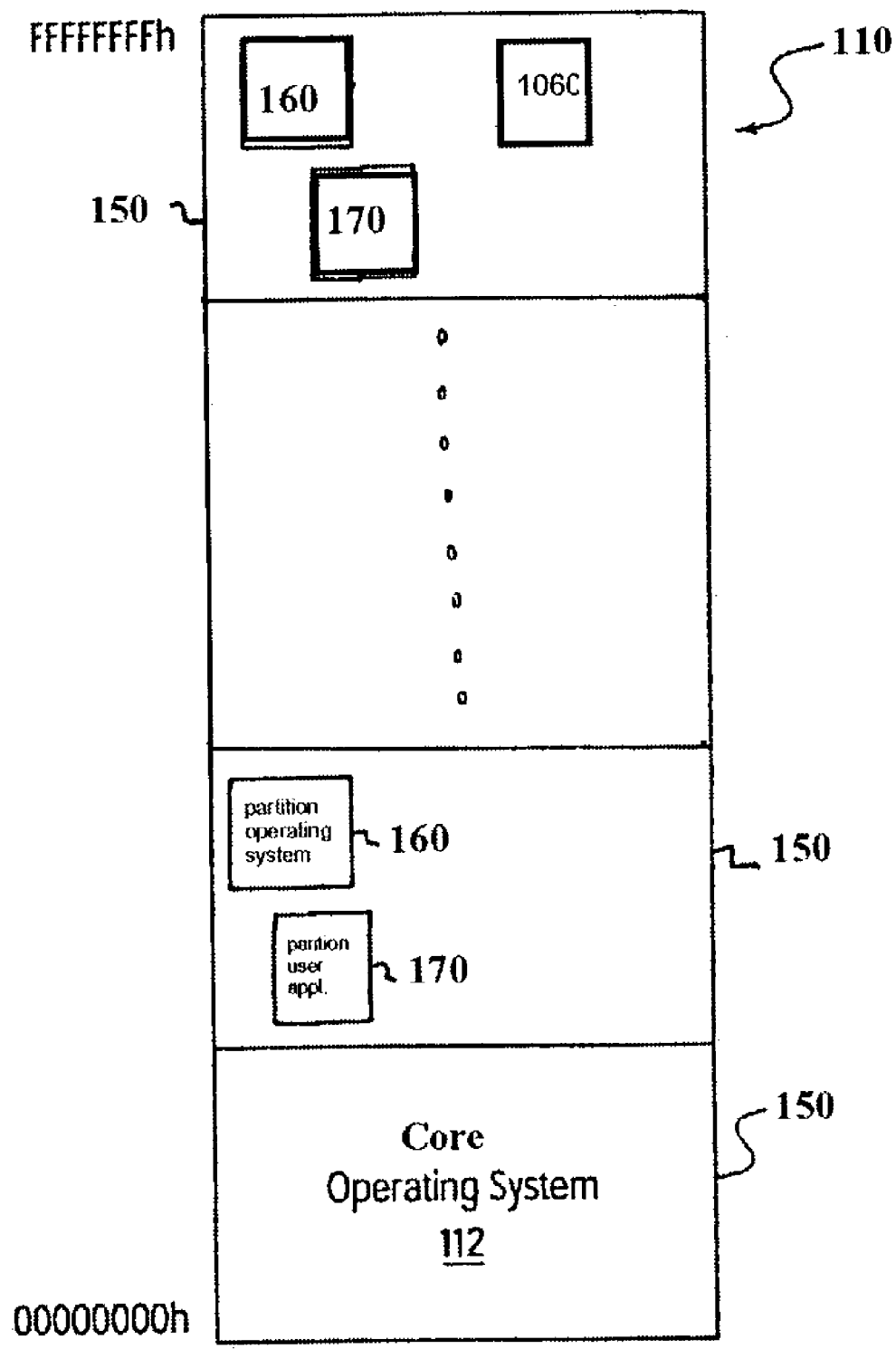
FIG. 3 shows the system space of FIG. 2 arranged into partitions according to an exemplary embodiment of the two-level operating system architecture according to the present invention.

Referring now to FIG. 3, there is illustrated the system space 110 of FIG. 2 arranged into partitions according to an exemplary embodiment of the two-level operating system architecture according to the present invention. The core operating system 112 instantiates a number of protection domains 150 to provide partitions within the memory system space 110, as will be described in more detail below. Instantiated within each partition defined by a protection domain 150 is a partition operating system 160 and a partition user application 170 (or requests resources outside the protection domain 150 via, for example, the OS abstraction layer to the core operating system as described below).

According to this exemplary embodiment of the present invention, each partition operating system 160 is dedicated to the respective partition user application 170 within the same protection domain 150, and the partition user application 170 interacts with the respective partition operating system 160. The partition operating system 160 allocates resources instantiated within the protection domain 150 to the respective partition user application 170. As discussed, each of the partition operating system 160 and the respective partition user application 170 of a particular protection domain-defined partition comprises objects including executable code and/or data structures. All of such objects are instantiated in the respective protection domain of the partition. The term "user application" is used herein to denote one or more user applications instantiated within a particular protection domain.

In this manner, user applications can be spatially separated into discrete partitions of the system space 110 so that they are unable to interact with each other, except through explicit mechanisms, as for example, under tight control of the two-level operating system architecture implementing the protection domain scheme. Moreover, each user application 170 can be controlled through explicit allocation of resources owned by the protection domain, by the partition operating system 160, to prevent the applications from affecting the operation of the entire system.

Pursuant to the exemplary embodiment of the present invention, the core operating system 112 performs certain functions for the overall system and/or on behalf of each partition operating system 160. As discussed, the core operating system 112 creates and enforces partition boundaries by instantiation of the protection domains 150. The core operating system 112 schedules partition processor usage among the several protection-domain-defined partitions, to determine which user application and respective partition operating system will be operating at any given time. In addition, the core operating system 112 can control system resource allocation, the passing of messages between the partitions, the handling of interrupts, the trapping of exceptions and the execution of system calls, on behalf of the partition operating systems 160, and the Input/Output systems 103.

Each of the partition operating systems 160 can be implemented from object components of a real time operating system such as, for example, VxWorks, marketed by Wind River Systems of Alameda, Calif. The components can include, for example, kernel, math, stdio, libc and I/O functionality of the VxWorks® real time operating system to achieve resource allocation for user task management and inter-task communication for the respective partition user application 170. Each partition operating system 160 is also implemented to support user-application level context switches within a partition, and to indirectly interact with I/O devices via calls to the core operating system 112. Each partition operating system 160 can also be configured to call the core operating system 112 for access to resources maintained at the system level, and for the handling of traps and exceptions by the core operating system 112. Accordingly, the partition operating system 160 appears to be the only operating system to user application 170, and thus user application 170 can be implemented in a standard manner, without consideration of the interface or operation of core operating system 112.

Figure 4:
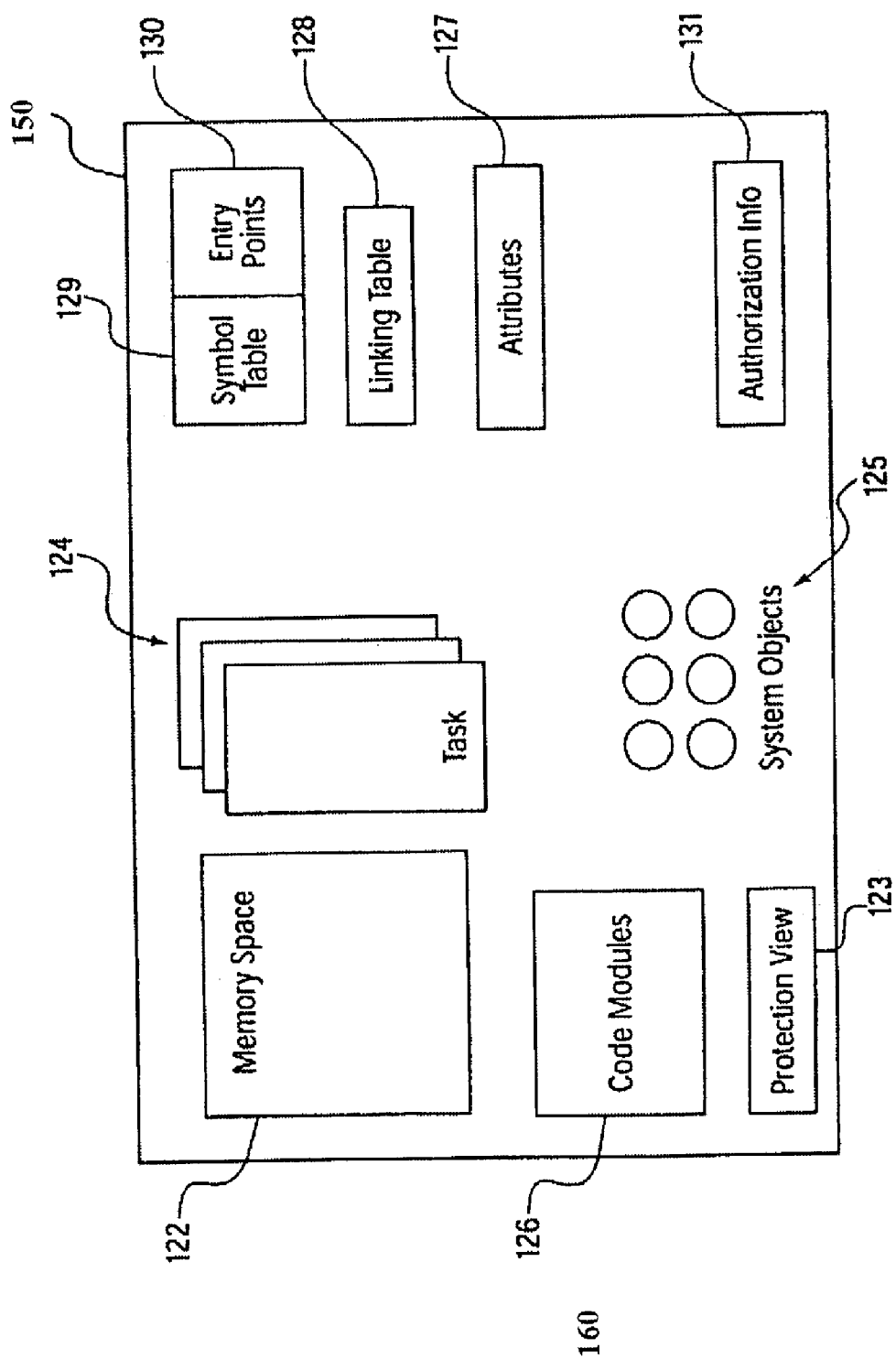
FIG. 4 shows a logical block diagram of an exemplary protection domain implemented in the system space of FIG. 3.

Referring now to FIG. 4, there is illustrated a logical block diagram of an exemplary protection domain 150, as may be created by the core operating system 112. The specific components capable of being "owned" by a protection domain 150 may be specified in the protection domain class definition. Exemplary protection domain 150 may be considered the owner of one or more of the following components:

a memory space 122, a protection view 123, zero or more code modules 126 containing executable code and/or data structures of, for example, the partition operating system and partition user application, a collection of protection domain "attributes" 127, a linking table 128 and a symbol table 129 including a list of entry points 130, zero or more tasks 124, and zero or more system objects 125 (e.g., semaphores, file descriptors, message queues, watchdogs).

Memory space 122 comprises a number of virtual memory locations from system space 110. These memory locations need not be contiguous, and may include memory mapped I/O locations. The amount of memory allocated to the memory space 122 of a protection domain 150 by the core operating system 112 may be specified at the time protection domain 150 is created. Additional memory may be dynamically allocated to memory space 122 by the core operating system 112 as needed from any free memory in system space 110. The code modules are stored within the memory space 122.

Figure 5:
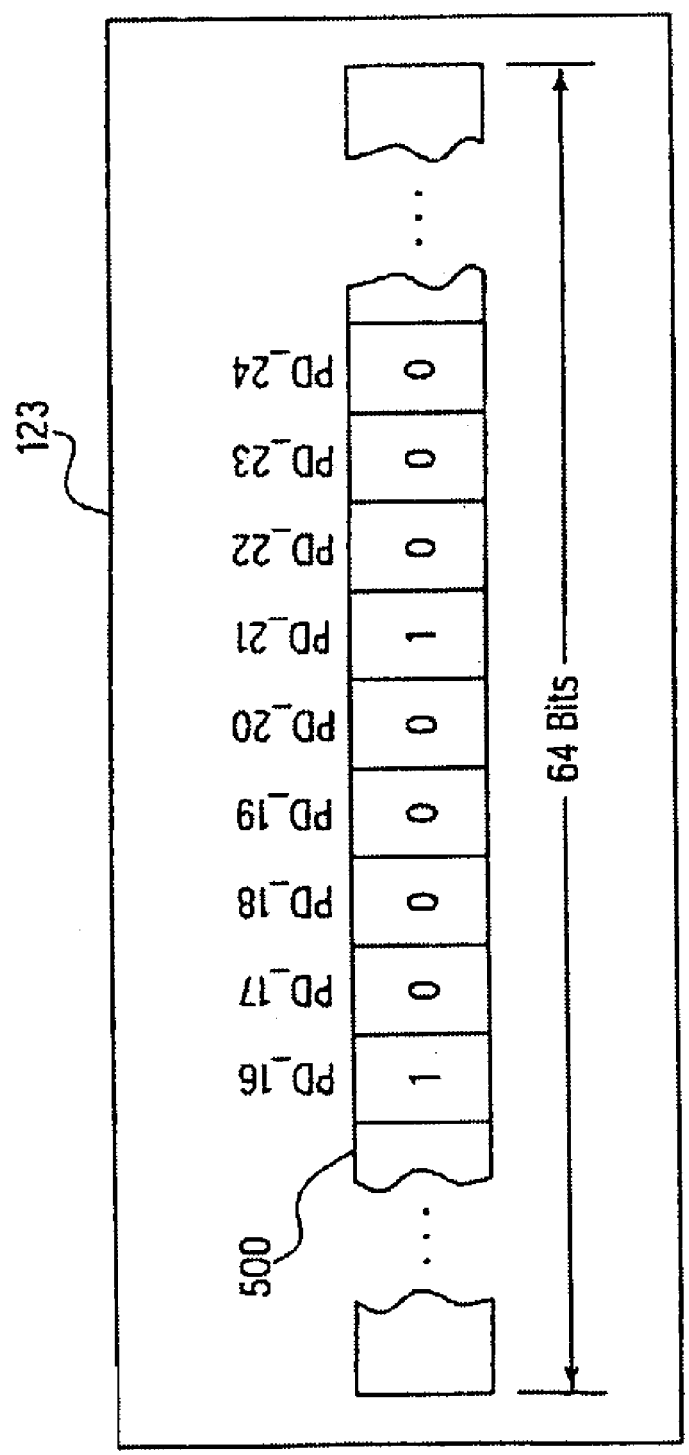
FIG. 5 shows an exemplary protection view data structure from the protection domain of FIG. 4.

Upon creation of the protection domain 150, the protection view 123 is established. The protection view 123 represents all of the protection domains 150 to which tasks executing in the protection domain 150 illustrated in FIG. 4 may have access. An exemplary protection view data structure 500 that may be used to represent the protection view 123 is illustrated in FIG. 5.

Protection view data structure 500 is a bit map for a particular protection domain 150, in which each protection domain 150 in the system space 110 is represented by a single bit. Where a bit is set, the respective protection domain 150 represented by the bit map has unprotected access to the memory space 122 of the corresponding protection domain in system space 110. Where a bit is not set, unprotected access is not permitted. The core operating system 112 may maintain information for mapping each bit to an existing protection domain 150. The size of the bit map defines the maximum number of protection domains supported in the system space 110; in this example, sixty-four protection domains are possible. Note that other data structures or different sized bit maps could be used to represent the protection view 123 to increase or decrease the number of protection domains that can be in a protection view. The default condition for a specific protection domain 150 is a protection view 123 that includes only the resources and objects of the memory space 122 of that protection domain 150, and no other protection domains. In the exemplary bit map of protection view data structure 500, this default condition may be represented by setting the bit corresponding to the illustrated protection domain, while leaving the remaining bits cleared (value zero). A protection domain 150 may expand its protection view 123 by being "attached" to other protection domains during the linking process when code modules or other objects are loaded into protection domain 150, pursuant to features of the VxWorksAE operating system.

Also upon creation of a protection domain 150 by the core operating system 112, a set of protection domain attributes 127 may be specified. These attributes may be used to control the actions allowed by tasks executing in the created protection domain 150, the linking permitted between the created protection domain 150 and other protection domains in the system space 110, and other characteristics of the protection domain 150. Among the protection domain attributes 127 supported by protection domains 150 of, for example, the VxWorksAE operating system are:

the name of the protection domain;

the maximum memory size of the protection domain;

whether the protection domain may be linked to by code modules in other protection domains ("linkage control");

the processor privilege mode that may be assigned to tasks created ("spawned") in the protection domain (e.g., user/supervisor);

Other attributes may also be used, depending on the specific implementation of the protection domain system.

In addition, during the protection domain creation process by the core operating system 112, the memory space 122 is loaded with code modules 126. Pursuant to certain embodiments of the present invention, the code modules 126 include the partition operating system 160 of the respective partition 150, and the respective user application 170. The code modules 126 comprising the partition operating system 160 and the respective partition user application 170, are therefore spatially separated from other code modules of system space 110 by a protection domain-defined partition. Thus, execution of user tasks, and resource allocation control functions of the partition operating system for the specific tasks, can be accomplished from within a protected and separated portion of the system space 110. Such an arrangement minimizes the ability of a user application from affecting anything within the system space that is beyond its partition.

For maximum security, the protection view of a partition 150 can be set in the default mode wherein only objects within the specific protection domain memory space 122 can be accessed by executable code executing within the partition 150. Thus, each partition operating system and partition user application pair can be substantially spatially isolated from all other system space.

However, the executable code may include a number of instructions, which, for example, in the case of a code module of the respective partition user application 170, reference other executable code or data structures outside of code module 126 (e.g., via a "jump" or "branch" instruction to execute a function). These references may be made using "symbols" that are intended to represent the memory location of the desired code or data structure. In order to determine ("resolve") the memory address value of these symbols, the loading of code modules 126 may include a linking process of the type provided in the VxWorksAE operating system, that attempts to resolve symbol references by searching for other occurrences of the symbol either in other code modules 126 already loaded into the respective protection domain 150, or in code modules loaded into other protection domains.

As illustrated in FIG. 4, a symbol table 129, with entry points 130, and a linking table 128, are provided. These tables are features of the VxWorksAE operating system that can be used to achieve protected links between executable code in one protection domain 150 and resources of another protection domain, if desired.

Pursuant to a feature of the exemplary embodiment of the present invention, the core operating system 112 schedules partition operation to determine which partition operating system, partition user application pair is to execute at any particular time. The core operating system implements temporal partitions, preferably using a time-multiplexed schedule, between the partition operating system, partition user application pairs of the protection domain-defined spatial partitions 150.

Figure 6:
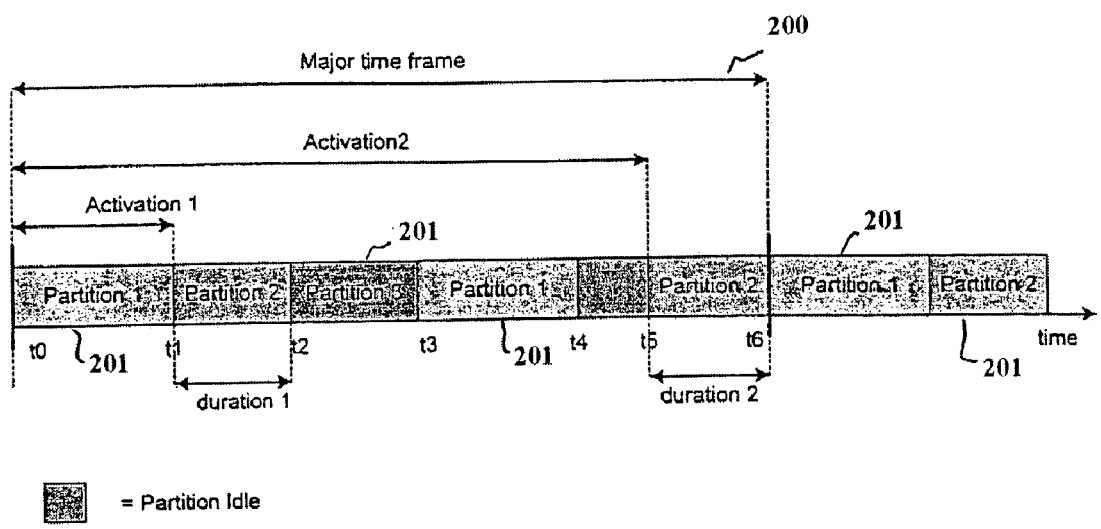
FIG. 6 shows a graphical representation of a time-multiplexed partition scheduling arrangement according to the present invention.

A preferred time-multiplexed schedule is illustrated in FIG. 6. A timing sequence comprises a series of major time frames 200. The major time frames 200 are repetitive, and each major time frame 200 has a predetermined, fixed periodicity. In this manner, the major time frames 200 are deterministic. The basic scheduling unit of the major time frame 200 is a temporal partition 201, and there is no priority among the temporal partitions 201.

Alternative schemes for providing temporal partitions could also be used. For example, a priority based scheme could be used wherein the partition with the highest priority task (or other operation) is scheduled for a specified duration.

Returning to the time-multiplexed schedule of FIG. 6, at least one temporal partition 201 is allocated to each protection domain-defined spatial partition 150, and a protection domain-defined partition 150 is activated by allocation of at least one temporal partition 201 from within the major time frame 200 to the particular partition 150. Each temporal partition 201 has two attributes, an activation time within the major time frame 200 (in FIG. 6, indicated by "t0" to "t6"), and an expected duration (in FIG. 6, indicated by duration 1, duration 2). Each temporal partition is defined by an offset from the start of a major time frame 200 (the activation time) and its expected duration. The duration of each temporal partition is set in fixed increments. The value of the increments can be configurable. As shown in FIG. 6, not all of the time available in a major time frame 200 may be scheduled to partitions. Such unscheduled time may be used by core operating system 112 for system operations or may simply be idle time.

In accordance with one preferred embodiment of the present invention, time management within a partition is accomplished through maintenance of a single timer queue. This queue is used for the management of watchdog timers, and timeouts on various operations.

Elements on the queue are advanced when a system clock "tick" is announced to the partition operating system. Each tick denotes the passage of a single unit of time. Ticks are announced to the partition operating system from the core operating system through a "pseudo-interrupt" mechanism (e.g., via a system clock tick event). During initialization of the partition operating system, the current tick count maintained by the partition operating system will be set to equal the value of the core operating system tick count (as a result, the tick count of each partition will be synchronized with each other and the core operating system). Preferably, there are no limits on the clock tick rate that can be accommodated by the partition operating system, other than the available processor cycles that can be utilized by the system in servicing clock hardware interrupts and issuing pseudo-interrupts.

Preferably, clock ticks are only delivered to a partition during that partition's window of execution (e.g., via a system clock tick event). When the core operating system schedules in a new partition, the clock ticks are then delivered to the newly scheduled partition. The issuance of clock ticks to the scheduled-out partition recommences at the start of the partition's next window. At this point, the core operating system announces, in batch mode (e.g., with a single pseudo interrupt), all the clock ticks that have transpired since the last tick announced to the partition in its previous window. In such a system, a timeout (or delay) can expire outside the partition's window, but the timeout is only acted upon at the beginning of the next partition window. It should be appreciated, however, that if a particular time out (or delay) is critical, the system integrator could simply increase the duration of temporal partition 201 for the corresponding spatial partition 150, or provide that a plurality of temporal partitions 201 be assigned to the spatial partition.

The batch delivery of clock ticks allows the core operating system to conserve processor cycles. Although the core operating system is still required to service the clock hardware interrupts, processor cycles are conserved by elimination of the overhead involved in issuing pseudo-interrupts, and the subsequent processing of the ticks within the various partition operating systems. This is particularly true for systems that require a timeout specification granularity of 0.25 milliseconds (which translates into 4000 ticks per second).

Scheduling of tasks within a partition can be implemented in a number of ways. For example, tasks within a partition may be scheduled using a priority scheme. In a preferred embodiment of the present invention, the priority scheme is implemented in accordance with a pre-emptive priority-based algorithm. In such an embodiment, each task has an assigned priority, and in each partition, the partition operating system scheduler uses the priority assigned to each task to allocate the CPU to the highest-priority task within the partition that is ready to execute.

In a pre-emption based scheme, pre-emption occurs when a task of higher priority than the currently executing task becomes ready to run. In general, a higher-priority task may become ready to run as a result of the expiration of a timeout, or the new availability of a resource that the task had been pending on. Pre-emptive events are delivered from the core operating system to the partition operating system, through the pseudo-interrupt mechanism. These events, which may result in a higher priority task becoming available, include but are not limited to, the system clock tick and system call completed signals (described below).

The scheduling of equal priority tasks can be implemented in a number of ways. For example, equal priority tasks can be scheduled on a first-come-first serve basis (e.g., using a queue of equal priority tasks). Alternatively, round-robin scheduling could be used. Preferably, the system allows the system integrator to select either round-robin scheduling or first-come-first-serve scheduling. Round-robin scheduling allows the processor to be shared by all tasks of the same priority. Without round-robin scheduling, when multiple tasks of equal priority must share the processor, a single non-blocking task can usurp the processor until pre-empted by a task of higher priority, thus never giving the other equal-priority tasks a chance to run. In accordance with round-robin scheduling, a "time slice" (or interval) is defined which represents the maximum time that a task is allowed to run before relinquishing control to another task of equal priority. Preferably, the "time slice" is a variable that can be set by calling an appropriate routine.

Figure 8:
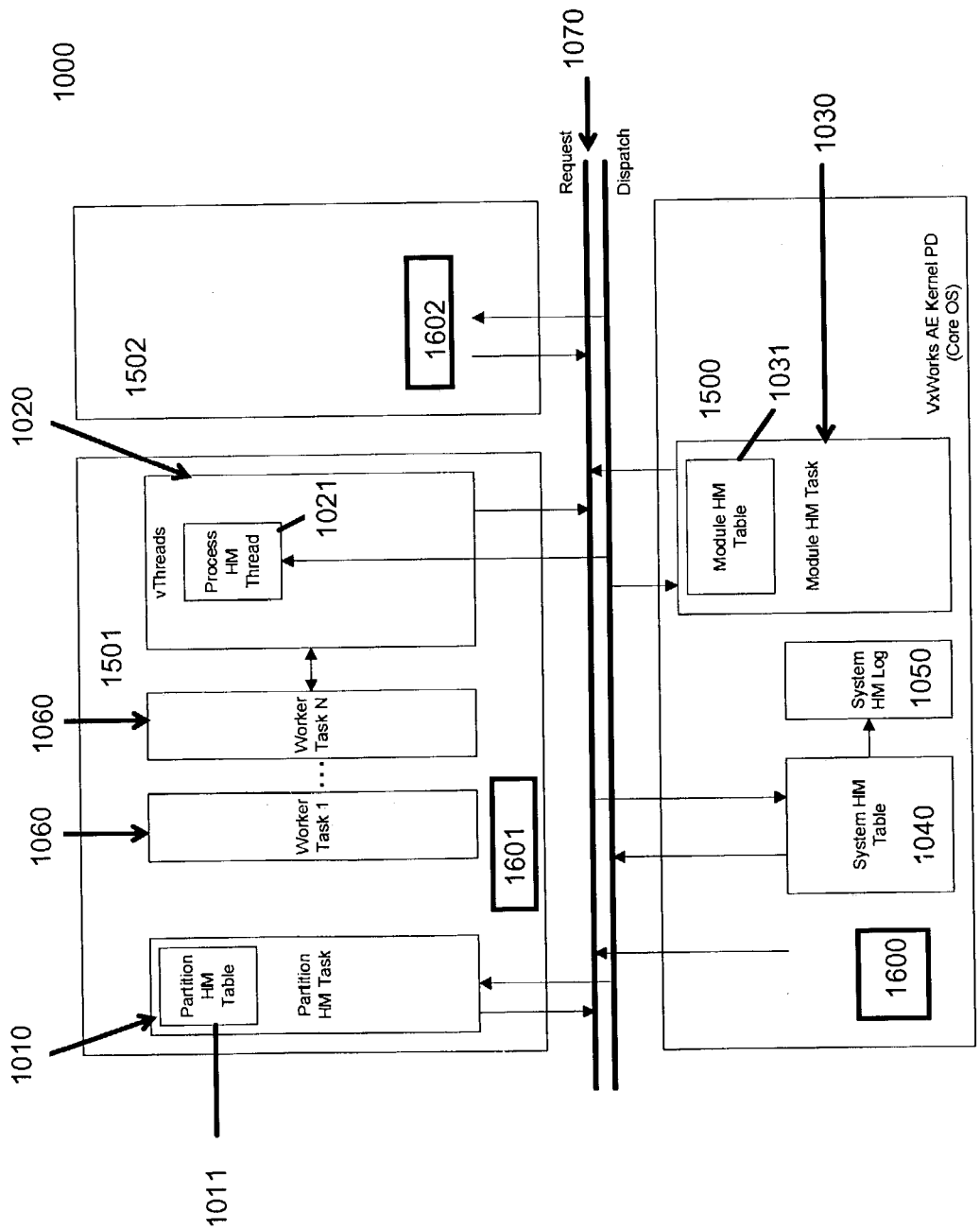
FIG. 8 shows a block diagram of a health monitoring system in accordance with an embodiment of the present invention from a scheduling perspective.

When a partition operating system 160, or an application running in a partition operating system 160, needs to request a service from the core operating system, a system call is issued from the partition operating system to the core operating system. If the system call is a blocking system call, then the core operating system assigns a worker task 1060 (which is a core operating system task executing in a partition (i.e., in the partition's temporal partition 201) as illustrated in FIGS. 3 and 8) to complete the request, and returns control to the partition operating system. The partition operating system then pends the requesting task, and schedules the next highest priority task that is ready to run. When the assigned core operating system task completes the system call, a system-call-complete pseudo interrupt is issued by the core operating system to the partition operating system. After receiving the system call complete, the partition operating system places the task in the "ready" queue (i.e., makes the task ready to run, but does not deschedule the current task). Alternatively, the system could be designed such that, upon receiving the system-call-complete, the partition operating system pends the currently executing task and schedules the requesting task. An exemplary implementation of this functionality is described in more detail in related U.S. application Ser. No. 10/273,333 referenced above.

Each partition operating system is preferably implemented as an executable entity on top of the core operating system. In a preferred embodiment of the present invention, the partition operating system operation does not depend on the details of the core operating system. Rather, the partition operating system simply needs a specific set of services to be provided by the core operating system, particularly services related to the underlying system hardware (e.g., I/O operations, interrupts, exceptions). To provide this level of functionality, an abstraction layer 1070 (see, e.g., FIGS. 7–8, discussed below) is preferably interposed between the partition operating systems and the core operating system.

Preferably, abstraction layer 1070 is a thin layer of code that abstracts the specifics of the underlying core operating system, allowing the partition operating systems to run. In order to provide sufficient separation among the core operating system and the various partitions, it is advantageous to limit the number, and nature, of communication between the core operating system and each partition operating system. This architecture allows the core operating system to be used with multiple types of partition operating systems (perhaps in the same overall system), and allows the partition operating system to run on more than one type of core operating system, with minimal changes. A particularly preferred embodiment of the abstraction layer will now be described, wherein the communication between the partition operating systems and the core operating system is limited to:

1. System Calls (from a partition operating system to the core operating system)
2. Pseudo-Interrupts (from the core operating system to a partition operating system)

In this embodiment, abstraction layer functionality resides in both the core operating system and each partition operating system. Each half of the abstraction layer understands the requirements and data format expected by the other half.

System calls are initiated by the partition operating system to request the core operating system to perform a desired service. In this example, there is only one system call API defined by the abstraction layer, which can multiplex all service requests. The partition operating system can request a core operating system service by issuing the system call (e.g., vThreadsOsInvoke( ), for purposes of illustration). This system call causes the portion of the abstraction layer in the partition operating system to issue a system call proper (e.g., valOsInvoke( ), for purposes of illustration) to the portion of the abstraction layer in the core operating system. In the core operating system portion of the abstraction layer, the system call proper is converted into an appropriate core operating system API call(s) which performs the desired service(s). Preferably, the set of system services (methods) that the partition operating system is allowed to request is limited.

As noted above, all service requests from the partition operating system are, in this example, invoked via the single system call (vThreadsOSInvoke( )). Upon receiving the system function call, the partition operating system portion of the abstraction layer issues the system call proper (valOSInvoke( )) as described above. The arguments of valOSInvoke( ) specify the service requested along with any additional parameters. The core operating system portion of the abstraction layer performs parameter validation on all system call arguments before invoking core operating system API functions.

An exemplary nomenclature for the valOsInvoke( ) function could be:

```
OS_INVOKE_STATUS valOsInvoke
(
    SYSCALL_METHOD    method,
    UINT32            *return Value,
    UINT32            *methodErrno,
    UINT32            cookie,
    UINT32            argument1,
    ...
    UINT32            argument n
);
``` wherein UINT32 is an unsigned integer.

In this example, the arguments given to valOsInvoke( ) are defined as follows:
   method: An enumeration that specifies the core operating system service to be invoked.
   returnValue: A pointer to an unsigned integer, which is de-referenced to store the return value from the system call.
   methodErrno: A pointer to an unsigned integer, which is de-referenced to store the error number value (if any) set by the system call.
   Cookie: A value that is unique to the requesting partition. Typically it is the ID of the partition operating system task that issued the request. This value has no significance to the core operating system. When the system call completes, the cookie is returned back to the requesting partition, and assists the partition operating system in identifying the task whose request has been completed.
   argument1 . . . argument n: The argument(s) that is passed to the core operating system function being invoked. There may be zero or more arguments to a system call, depending on the service requested.
   OS_INVOKE_STATUS: Enumerated result code of the call. Can be one of OK, ERROR, PENDING, OSNOTREADY, or BADPARAMS.

The actual invocation of core operating system services depends on the mechanism that is used by it (e.g. the Linkage Table method for VxWorks AE, or a UNIX-style system call invocation). Only the core operating system portion of the abstraction layer need know the details of how core operating system services are invoked. An exemplary implementation of the abstraction layer functionality is described in more detail in related U.S. application Ser. No. 10/273,333 referenced above.

As noted above, pseudo-interrupts may be used, inter alia, to provide asynchronous event notification/information (including clock tick and service call complete events) to the partition operating system (as contrasted with a tradition hardware interrupt/exception). A preferred implementation of the pseudo interrupts will now be described in more detail. In accordance with this implementation, each partition has a corresponding event queue in the system protection domain. This event queue may, for example, be organized as an array of event structures. The core operating system follows a two-step process in delivering a pseudo-interrupt to a partition operating system: first, an event is placed in the queue, and then, a signal is sent to the receiving partition operating system. An exemplary set of events is as follows:

1. Power Interruption
2. Synchronize: used by the core operating system to detect whether the specified partition operating system is executing a critical code section, such that access of operating system data structure may produce inaccurate results. Useful for interactions with development tools
3. System Clock Tick: reports the occurrence of a "tick" of the system clock, allowing each partition operating system to receive synchronized time information.
4. Port Receive Notification: indicates that a message has been received at a destination buffer 303 (see FIG. 7, and accompanying discussion).
5. Port Send Notification: indicates that a message in a source buffer 302 has been sent (see FIG. 7, and accompanying discussion).
6. System Call Complete: reports the completion of a previously requested system call to the core operating system that was dispatched to a worker task.

It should be noted, however, that synchronous exceptions are not queued in this implementation. Rather, the core operating system re-vectors the program flow of the partition's code by directly changing the program counter (pc) to execute the partition's synchronous exception handler. An exemplary implementation of the pseudo interrupts are described in more detail in related U.S. application Ser. No. 10/273,333 referenced above.

Pursuant to another feature of the present invention, a communication system is provided to permit the passing of messages between partitions 150. A message is sent from a single partition 150 to one or more other partitions 150. In the exemplary embodiment of the present invention, the communication system comprises ports, messages and a channel. Each partition which desires bidirectional communication with other partitions includes at least one source port and at least one receiving port. A partition that does not need to communicate with other partitions can include zero ports, and a partition that needs to provide only one way communication could potentially include only one port. In any event, the channel is a logical set of source and receiving ports for the transmission of messages.

Figure 7:
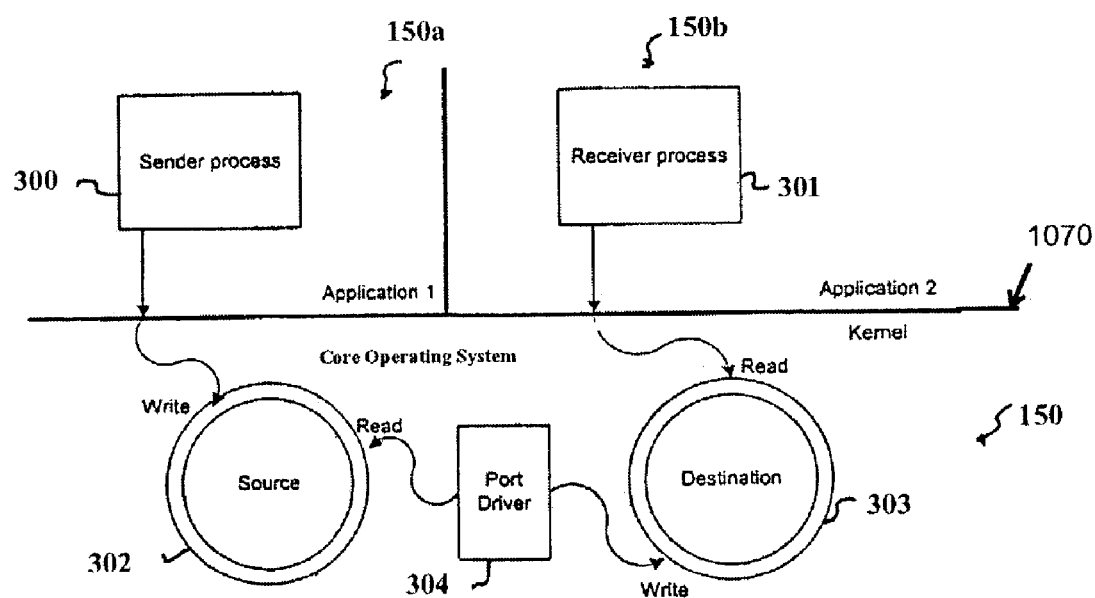
FIG. 7 is a block diagram of a communication system for inter-partition message passing according to an exemplary embodiment of the present invention.

Referring now to FIG. 7, there is illustrated an exemplary communication system for passing a message between two of the partitions 150. In this example, the sending partition 150a includes a sender process 300, and the receiving partition 150b includes a receiver process 301. Moreover, each of a source port 302 for the sending partition 150a and a receiving port 303 for the receiving partition 150b comprises a circular buffer implemented in the core operating system 112. Each circular buffer is defined by a set of attributes including, for example, an identification of the partition with which it is associated, and whether it is a source port or a receiving port.

A port driver 304 is implemented in the core operating system 112, and is operable to read messages stored in each source port 302 and to write the read messages into the receiving port(s) 303 of the partition(s) identified in the message as the receiving partition(s) 150b. When the sending partition 150a needs to send a message to the receiving partition 150b, the sender process 300 formats a message, including, for example, a message descriptor to identify such information as source and destination of the message. The sender process 300, utilizing the partition operating system 160 (not shown) and the abstraction layer 1070, then writes the message into the corresponding source port 302 circular buffer in the core operating system 112. The sender process 300 then updates a write pointer. The port driver 304 reads each message in the source circular buffer and writes each read message into the receiving port 303 circular buffer of the receiving partition 150b identified in the message descriptor of the message. According to the exemplary embodiment, of the present invention, utilizing the partition operating system 160 (not shown) and the abstraction layer 1070, a receiver process 301 in each receiving partition 150b periodically reads the messages stored in the corresponding circular buffer comprising the receiving port 303 of the partition 150b. A table of message descriptors can be maintained by the core operating system 112 to enable the core operating system 112 to track all messages. Exemplary implementation of interpartition communication systems are described in more detail in related U.S. application Ser. No. 10/273,305 referenced above.

In accordance with another embodiment of the present invention, a health monitoring system may be provided in connection with the two-level operating system. The health monitoring system (HMS) is preferably implemented with a three level architecture, including a core operating system HMS component residing in the system protection domain, and in each other protection domain, a partition operating system HMS component and a partition application HMS component.

FIG. 8 shows an illustrative HMS 1000 in accordance with an embodiment of the present invention from a scheduling perspective. The system 1000 includes a system protection domain (or core operating system space) 1500, a first spatial partition 1501 implemented as a first protection domain and including a first partition operating system HMS component 1010 and a first partition process HMS component 1020, and a second spatial partition 1502 implemented as a second protection domain and including a second partition operating system HMS component (not shown) and a second partition application HMS component (not shown). Partition 1501 includes a first partition operating system 1601, partition 1502 includes a second partition operating system 1602, and the system partition includes the core operating system 1600. Additional partitions with associated protection domains, partition operating systems and components may also be provided. It should be noted that in this preferred system, assuming N partitions, there can be from 1 to N process HMS components 1020, with each partition potentially having its own respective component 1020.

As described in more detail below, the HMS provides a mechanism for responding to events. An event is the base unit of injection within the HMS. An event can be either an alarm or a message.

A fault is an event occurring in a system that needs attention from the system. It could be either positive or negative for the system. Examples of faults include hardware-generated exceptions, error paths in the code, thresholds crossed, etc. An alarm is the software representation of a fault. It is generated by the code that detects the fault so that the application or system can provide some recovery mechanism.

Alarms have information associated with them, which assist the system in responding to the alarm. For example, in the preferred embodiment described in more detail below, the alarm has an associated code and, if applicable, an associated subCode and other information. A message, in contrast, is an event that should be logged but not handled. Messages also have information associated with them, as described below.

Referring to FIG. 8, after an alarm is injected, it is sent to the system HM 1040. The system HM 1040 acts as the dispatcher for the HMS. In a preferred embodiment of the present invention, the system HM is implemented as a table which relates the alarm code and system status at the time of an event injection to a corresponding HMS component (either process 1020, partition 1010 or module 1030) which is designated to respond to the event. If the event injected is a message, the system HM 1040 simply logs the message to the HM log component 1050. Preferably, the system HM table is static and is created by the system integrator. With such a table, the system integrator is free to set any desired handling scheme for any given event.

In other embodiments of the present invention, a system HM table could additionally be provided in each partition to avoid the need for system calls from the partition to the system HM table in the core operating system space. In certain embodiments, all of the system HM tables are identical. In other embodiments, the contents of the HM table could vary from partition to partition, with a unique HM table potentially being provided in each partition.

In terms of memory layout, the process HMS 1020 (including process HM thread or error handler process 1021) runs within the partition operating system 1601; and the partition HMS preferably runs as a separate core operating system task (stack is in the system protection domain 1500) with a higher priority than the partition operating system 1601 (and thus, the process HMS 1020) but scheduled during the same partition window as the partition operating system. As such, for the purposes of the present invention, the partition HMS 1010 is considered to be located in and executing in the partition. The module HMS 1030 runs as a highest priority task in the core operating system 1600. Its priority will be higher than that of the partition HMS 1010. It is advantageous to implement the partition HMS 1010 as a core operating system task because this simplifies the task of restarting the partition with the partition HMS. It also reinforces the separation between the partition HMS 1010 and the process HMS 1020. One reason that the partition HMS 1010 is scheduled within the temporal partition 201 of its corresponding partition is so that a faulty application cannot generate a flow of events, thus forcing the partition HMS 1010 to handle the event by stealing time from another partition.

It should be noted that the worker tasks 1060 and partition HMS 1010 are shown in the partition 1501 of FIG. 8 because FIG. 8 is illustrating the HMS from a scheduling perspective and components 1010 and 1060 execute within the temporal partition 201 of the partition 1501.

In the preferred embodiment of FIG. 8, the partition HMS 1010 is implemented with a partition HM table 1011. This table is configurable by the system integrator, and includes, for each alarm code in the table, a reference to a corresponding alarm handler for responding to the alarm. The module HMS 1030 is preferably implemented with a module HM table 1031 in the same manner. In the embodiment of FIG. 8, however, the process HMS 1020 is implemented with a single alarm handler, referred to herein as either the error process handler or the process HM thread 1021. Alternative arrangements are also possible, e.g. one or both of the partition HMS 1010 and module HMS 1030 could be implemented with a single alarm handler, or the process HMS 1020 could be implemented with a configurable table referencing a plurality of alarm handlers.

An event is the base unit of injection in the HMS, and, as described above, is generally injected by the code that detects the corresponding fault. This code may be located in any one of the protection domains (e.g., 1500, 1501, 1502). An event (alarm or message) can be injected by calling an appropriate function, e.g., HM_EVENT_INJECT( ) (for purposes of illustration).

Continuing with this exemplary nomenclature, an alarm could be injected at any time and optionally associated with an object (e.g., the object which caused the alarm, such as a semaphore, message queue, etc.) by calling HM_EVENT_INJECT( ) using a code that corresponds to an alarm (e.g., any code other than the code designated for messages (e.g., HM_MSG)). Messages can also be injected at any time, by calling HM_EVENT_INJECT( ) with the designated code for messages, e.g., HM_MSG (for purposes of illustration). It should be noted, however, that since only one partition can be active at any given time, events can only be injected from code within a partition when that partition is active. Taking the example of a time-multiplexed schedule wherein each partition is active in one or more temporal partitions 201 (time slots), an event (e.g., an alarm) could be injected from code within a first partition 1501 during that partitions time slot, but not during the time slot of second partition 1502. However, an event injected from code within the system partition 1500 could be injected at any time.

In any event, once an alarm is injected, it will be sent to the system HM table 1040 to determine its dispatch level. An alarm injected from within a partition is preferably transmitted to the system HM table 1040 via the abstraction layer 1070 which separates the core operating system 1600 from the partition operating systems 1601, 1602 in the partitions.

Preferably, a number of general rules are applied to dispatching. Within the boundaries of these rules, the system integrator can configure alarm handling via the system HM table 1040, the module HM table 1031, and the partition HM table 1011:

1) If an attempt is made to dispatch to a process HMS 1020 which is not installed, the alarm will automatically be dispatched to the partition HMS 1010 in the same partition. In this regard, the process HMS 1020, as described above, need not be present in each partition. Preferably, a process HMS 1020 can be installed in a partition by calling an appropriate function, e.g., hmErrorHandlerCreate( ) (for purposes of illustration), from within its corresponding partition.

2) Alarms injected at exception or interrupt context are treated exactly as alarms injected from task level.

3) Alarms are not normally escalated and a handler that cannot handle an alarm must either inject an alarm of its own or return an ERROR to the system HM table 1040. If an ERROR is returned, once the ERROR is received at the core operating system, another alarm is injected by a task on the core operating system with the code HME_PROCESS_HM_ERROR (for an error returned from the process HMS 1020), HME_PARTITION_HM_ERROR (for an error returned from the partition HMS 1010), or HME_MODULE_HM_ERROR (for an error returned from the module HMS 1030). The system integrator can decide, via the system HM table, how to handle these errors (for instance, the system integrator could set up the system HM table to escalate the alarm until a HME_MODULE_HM_ERROR is encountered). In this regard, it is recommended that the system HM table 1040 include a handler for HME_MODULE_HM_ERROR that reboots the system as this is a fatal error. As noted above, if an alarm handler in the partition HMS component 1010, the process HMS component 1020 or the Module HMS component 1030 cannot handle an alarm, it may be configured to inject an alarm of its own. In this regard:

a) Alarms injected from within a process HM handler have their code reset to HME_PROCESS_HM_ERROR and their original code becomes the subCode (the original subCode, if set, is lost in this case).

b) Alarms injected from within the partition HM handler have their code reset to HME_PARTITION_HM_ERROR and their original code becomes the subCode (the original subCode, if set, is lost in this case).

c) Alarms injected from within the module HM handler have their code reset to HME_MODULE_HM_ERROR and their original code becomes the subCode (the original subCode, if set, is lost in this case).

When an alarm is injected at the process HMS component 1020, the current partition operating system task will be pended until the alarm is handled by the process HM thread (which, as mentioned above, is an alarm handler). When an alarm is injected at the partition HMS component 1010, the current partition will be pended and the table driven handler in partition HM table 1011 will run. When an alarm is injected at the module HMS component 1030, all partitions will be pended until the alarm is handled by the table driven handler in module HM table 1031.

In general, alarm handlers should not issue blocking calls (e.g., pending a task running on the partition operating system, pending the partition operating system, pending all partition operating systems) without first taking proper precautions to ensure that the injector of the alarm does not execute until the health concern has been fully handled. In this regard, the HMS assumes it is called synchronously within the context of the task or interrupt injecting the alarm. It then dispatches the alarm to the appropriate level (component 1010, 1020, or 1030) and it assumes that the health monitor task present at that level (e.g., the alarm handler) will pre-empt the current context (that which injected the alarm, or if injected from interrupt context, the handler will intentionally be deferred). Thus, if the handler context is pended due to a blocking call from the alarm handler, the injecting context (if the injector was a task and not an interrupt handler) could be scheduled to run without having fully handled the health concern that occurred in that task. To prevent such an occurrence, it would be desirable, for example, to suspend the offending task before issuing a blocking call in the context of the handler.

Preferably, each process HMS alarm handler is located in the same partition operating system instance which created its context to execute, each partition HMS alarm handler is located in the core operating system protection domain 1500, and each module HMS alarm handler is located in the core operating system protection domain 1500. It should also be noted that there is a partition HM table 1011 per partition and that there is a potential for a process HMS 1020 per partition. As noted above, a user can create the process HM by, for example, calling hmErrorHandlerCreate( ).

An alarm can be dismissed (successfully handled from the standpoint of the HMS) by either returning OK from a handler or by setting a NULL handler in the partition HM table 1011 or module HM table 1031 for that given code and system status, or by setting the dispatch level to HM_NO_LVL for the given system status and code (which will result in an OK status being returned). As such, by choosing to place a NULL handler or HM_NO_LVL code in the system HM table 1041, the system integrator has indicated that no action needs to be taken in response to the alarm.

As noted above, a message is a special instance of an event injection. This special event also has two distinguishing special features. First, whereas an alarm is only logged if automatic logging is enabled or if a handler explicitly logs the alarm using hmEventLog( ), a message is always logged irregardless of anything else. Second, whereas an alarm is dispatched based on the system HM table 1040, a message is not dispatched at all and is only logged.

Alarm and message logging can be accomplished in a variety of ways. As an example, messages (and, if automatic logging of alarms is enabled, alarms) can be logged after the event is received at the system HM table 1040, as illustrated in FIG. 1. In addition, or as an alternative, alarms (and/or messages) can be logged by having the handler that is responding to the event cause a system call to log the alarm (or message) using an appropriate function call, e.g., hmEventLog( ), for purposes of illustration. Although the contents of the log 1050 can take a variety of forms, an exemplary set of log 1050 fields is set forth below:

| Field | Description |
| --- | --- |
| Code | The code of the injected event |
| subCode | The subCode that was associated with the event. This field will be zero if no subCode was given |
| Level | The level at which the alarm was initially dispatched: 0 if the event is a message, 1 if the event was an alarm injected to HMS process component 1020, 2 if the event was an alarm injected to HMS partition component 1010, and 3 if the event was an alarm injected to the HMS module component 1030. |
| timestamp | The time at which the event is injected. Preferably, the time is the system absolute time. |
| sysStatus | The status of the system when the event is injected, e.g., initializing module HMS, initializing partition HMS, system scheduler online, switching partitions, implementing a system call, etc. |
| addrInfo | The filename and line number from which the event is injected. |
| partName | A NUL terminated string representing the partition name from which the alarm or message originated. If the alarm or message did not come from a partition, then 'Core OS' will appear |
| taskName | A NUL terminated string representing the task name from which the alarm or message originated. If the alarm or message originated from interrupt context then the string will read 'INTERRUPT' |
| objName | The name of the object that was associated with the alarm or message. This field is optional, and includes a NULL character is not used. |
| procIdf | A process identifier which may be designated by the system specifications, e.g., an Avionics Application Software Standard Interface (ARINC) process identifier, for example. |
| msgLen | The length (in bytes) of the message body |
| Msg | The message body (which is msgLen bytes in size) |

In accordance with another embodiment of the invention, a log 1050 can be provided in each partition and in the core operating system space. In accordance with this embodiment, message events from within a partition are logged in that partition's log unless a specific request is made to log it in the log 1050 in the core operating system space (e.g., hmEventInject( )).

When an alarm event is injected and a fault recovery action is taken, it is sometimes desirable to inform other partitions of this event. An example of such an event might be a partition shutdown. Other partitions might be interested to know when another partition is shut down. To provide this information, the system preferably includes a notification mechanism.

In a preferred embodiment of the present invention, the notification mechanism comprises a notification software agent running on the core operating system 1600 in the system protection domain 1500. Preferably, this software agent can be accessed from either partition HMS component 1010's alarm handlers or the module HMS component 1030's alarm handlers, and informs all partitions registered of the indicated event.

For a partition to be notified of events, the partition registers with the notification agent by calling a function (e.g., hmNotificationReg( ), for purposes of illustration) which specifies the codes of the alarms of which it wishes to receive notification. The function responds with an ID to a message queue. In this regard, the system preferably maintains a separate message queue for each partition which is registered for notification. Alternatively, the system could simply create a message queue for each partition, regardless of whether that partition has registered for notification. In any event, the ID for the message queue for a partition is returned to that partition in response to the registration function.

Preferably, the specification of codes for a given partition is implemented as a filter mask. The filter mask is a bit mask, with each bit corresponding to an alarm code. For example, a 32 bit mask would allow the partition to register an interest in any or all of the alarms with codes ranging from 0–31. It should be noted that not all of the alarm codes need to be represented in the mask. Rather, only the alarm codes that correspond to alarms for which inter-partition notification is desired need to be represented. For example, in the 32 bit mask referenced above, alarms with codes greater than or equal to 32 could correspond to events that are not valid for broadcast to other partitions (such as HM_MSG).

Preferably, when an alarm occurs, a notification is initiated by the handler to which the alarm has been dispatched. To initiate the notification, the handler may, for example, call an appropriate function (e.g. hmNotify( ), for purposes of illustration) that notifies all registered partitions of the alarm.

Preferably, notification is outside the scope of the time and space containment. In other words, the process of notifying other partitions of a given event does not have to occur during the time allotment for the partition which asked for the notification. However, in the case of notification from a handler in a partition HMS component 1010, the notification is preferably initiated when that partition is active (e.g., during that partition's temporal partition 201).

In certain embodiments of the present invention, a partition can select which other partitions it is willing to accept notifications from. In this regard, the system integrator can designate, on a partition by partition basis, a list of "trusted" partitions for any given partition. In such an implementation, a given partition would be notified of an event only if i) the event occurred in a "trusted" partition; and ii) the code of the event was a code of interest (e.g., designated in the filter mask).

As noted above, in response to the registering function (e.g., hmNotificationReg( )), global message queues are preferably generated between the notification agent and each partition. Each partition is responsible for spawning a task to pull messages off its respective message queue. As noted above, a message queue ID is returned from the hmNotificationReg( ) function. Preferably, if a message queue for a partition becomes full, the notification agent will inject an alarm event on the message queue in question and flag the message queue as invalid, thereby excluding that partition from future notifications. In order to reinstate notification, the handler (or another task in the partition) must fix the problem (e.g., by emptying at least part of the queue), and then re-register the partition with the notification agent by calling hmNotificationReg( ). Alternatively, the system could maintain a back-logged queue of undelivered notifications, and provide these notifications once the partition is re-registered.

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. A method for generating and responding to alarms in a computer system:
   providing a plurality of protection domains in a system space including a system protection domain and a plurality of partition protection domains, the system protection domain including a core operating system, each partition protection domain providing a spatial and temporal partition including a partition operating system and a partition user application;
   generating an alarm in one of the partition protection domains;
   transmitting the alarm to the core operating system via the partition operating system in said one of the partitions;
   accessing an alarm dispatcher in the system protection domain via the core operating system;
   determining, via the alarm dispatcher, an alarm level of the alarm, wherein the alarm level is one of a system alarm level and a partition alarm level;
   if the alarm level is the system alarm level, dispatching the alarm to a system alarm handler in the system protection domain via the core operating system; and
   if the alarm level is the partition alarm level, dispatching the alarm to a partition alarm handler in said one of the partitions.

2. The method of claim 1, wherein the alarm can be one of a plurality of alarm types, and wherein the alarm includes an alarm code that identifies its corresponding alarm type, and wherein the alarm dispatcher includes a system dispatcher table associating each alarm code with one of the system alarm level and the partition alarm level.

3. The method of claim 2, wherein the system dispatcher table is editable by a system integrator.

4. The method of claim 2, wherein each partition alarm handler comprises a partition table and a plurality of partition alarm handlers, and wherein each partition table includes information indicative of a corresponding one of the plurality of partition alarm handlers for each of the alarm codes corresponding to the partition alarm level.

5. The method of claim 4, wherein the partition table is editable by a system integrator.

6. The method of claim 2, wherein each partition alarm handler further includes computer executable process steps operative to control a processor to respond to each alarm having the partition alarm level, and the system alarm handler includes computer executable process steps operative to control a processor to respond to each alarm having the system alarm level.

7. The method of claim 1, wherein, if an alarm is dispatched to the partition alarm handler and the partition alarm handler is unable to clear the alarm, said partition alarm handler returns an error to the alarm dispatcher.

8. The method of claim 1, wherein if a first alarm is dispatched to the partition alarm handler and the partition alarm handler is unable to clear the first alarm, said partition alarm handler generates a second alarm, and transmits the second alarm to the alarm dispatcher.

9. The method of claim 8, wherein an alarm code of the second alarm is different than an alarm code of the first alarm.

10. The method of claim 9, wherein the second alarm further includes an alarm sub-code, and wherein the alarm sub-code is the same as the alarm code of the first alarm.

11. The method of claim 7, wherein the alarm dispatcher, upon receiving the returned error, dispatches a new alarm.

12. The method of claim 1, further comprising an OS abstraction layer, the OS abstraction layer providing an interface between the core operating system and each partition.

13. The method of claim 1, further comprising a notification software agent implemented in the system protection domain, the notification software agent maintaining, for each registered one of the plurality of partitions, one or more alarm types of which the registered partition desires notification; and wherein, upon receiving notification of an alarm, the notification software agent notifies each partition registered for the alarm type of the received alarm.

14. The method of claim 13, wherein the notification software agent receives notification of the alarm from one of the partition alarm handler and the system alarm handler.

15. A method for generating and responding to alarms in a computer system:
providing a plurality of protection domains in a system space including a system protection domain and a plurality of partition protection domains, the system protection domain including a core operating system, each partition protection domain providing a spatial and temporal partition including a partition operating system and a partition user application;
generating an alarm in one of the partition protection domains;
transmitting the alarm to the core operating system via the partition operating system in said one of the partitions;
accessing an alarm dispatcher in the system protection domain via the core operating system;
determining, via the alarm dispatcher, an alarm level of the alarm, wherein the alarm level is one of a system alarm level, a partition alarm level, and a process alarm level;
if the alarm level is the system alarm level, dispatching the alarm to a system alarm handler in the system protection domain via the core operating system;
if the alarm level is the partition alarm level, dispatching the alarm to a partition alarm handler in said one of the partitions;
if the alarm level is the process alarm level, dispatching the alarm to a process alarm handler in said one of the partitions via the core operating system and the partition operating system in said one of the partitions.

16. The method of claim 15, wherein the alarm can be one of a plurality of alarm types, and wherein the alarm includes an alarm code that identifies its corresponding alarm type, and wherein the alarm dispatcher includes a system dispatcher table associating each alarm code with one of the system alarm level, the partition alarm level, and the process alarm level.

17. The method of claim 16, wherein the system dispatcher table is editable by a system integrator.

18. The method of claim 16, wherein each partition alarm handler comprises a partition table and a plurality of partition alarm handlers, and wherein each partition table includes information indicative of a corresponding one of the plurality of partition alarm handlers for each of the alarm codes corresponding to the partition alarm level.

19. The method of claim 18, wherein the partition table is editable by a system integrator.

20. The method of claim 16, wherein each partition alarm handler further includes computer executable process steps operative to control a processor to respond to each alarm having the partition alarm level, each process alarm handler includes computer executable process steps operative to control a processor to respond to each alarm having the process alarm level, and the system alarm handler includes computer executable process steps operative to control a processor to respond to each alarm having the system alarm level.

21. The method of claim 15, wherein, if an alarm is dispatched to one of the partition alarm handler and the process alarm handler and said one alarm handler is unable to clear the alarm, said one alarm handler returns an error to the alarm dispatcher.

22. The method of claim 15, wherein if a first alarm is dispatched to one of the partition alarm handler and the process alarm handler and said one alarm handler is unable to clear the first alarm, said one alarm handler generates a second alarm, and transmits the second alarm to the alarm dispatcher.

23. The method of claim 22, wherein an alarm code of the second alarm is different than an alarm code of the first alarm.

24. The method of claim 23, wherein the second alarm further includes an alarm sub-code, and wherein the alarm sub-code is the same as the alarm code of the first alarm.

25. The method of claim 21, wherein the alarm dispatcher, upon receiving the returned error, dispatches a new alarm.

26. The method of claim 15, further comprising an OS abstraction layer, the OS abstraction layer providing an interface between the core operating system and each partition.

27. The method of claim 15, further comprising a notification software agent implemented in the system protection domain, the notification software agent maintaining, for each registered one of the plurality of partitions, one or more alarm types of which the registered partition desires notification; and wherein, upon receiving notification of an alarm, the notification software agent notifies each partition registered for the alarm type of the received alarm.

28. The method of claim 27, wherein the notification software agent receives notification of the alarm from one of the partition alarm handler and the system alarm handler.

29. The method of claim 1, wherein the partition alarm handler resides in the system protection domain, but executes only during the temporal partition of said one of the partitions.

30. The method of claim 15, wherein the partition alarm handler resides in the system protection domain, but executes only during the temporal partition of said one of the partitions.

31. A computer system, which comprises:
a core operating system; and
a system space having a number of memory locations;
the core operating system arranged to create a number of protection domains to partition the system space into a core operating system space and a plurality of partitions; and
a partition operating system, a partition user application, and a partition alarm handler in each partition, each partition operating system providing resource allocation services to the respective partition user application within the partition;
an alarm dispatcher and a system alarm handler in the core operating system space, the alarm dispatcher configured to receive alarms and to dispatch the alarms to one of the alarm handlers.

32. A computer system, which comprises
a core operating system;
a system space having a number of memory locations;
the core operating system arranged to create a number of protection domains to partition the system space into a core operating system space and a plurality of partitions;
a partition operating system and a partition user application pair in each partition, whereby the partition operating system, partition user application pairs of the partitions are spatially partitioned from each other;
a partition alarm handler in each partition;
each partition operating system of each pair providing resource allocation services to the respective partition user application within the partition, the core operating system time multiplexing the partitions such that the partition operating system, partition user application pairs are temporally partitioned from each other;
an alarm dispatcher and a system alarm handler in the core operating system space, the alarm dispatcher configured to receive alarms and to dispatch the alarms to one of the alarm handlers.

33. A method for operating a computer system, comprising the steps of:
implementing a core operating system;
providing a system space having a number of memory locations;
operating the core operating system to create a number of protection domains to partition the system space; and
implementing a partition operating system and a partition user application pair in each partition, whereby the partition operating system, partition user application pairs of the partitions are spatially partitioned from each other;
operating each partition operating system of each pair to provide resource allocation services to the respective partition user application within the partition;
implementing a partition alarm handler in each partition and a system alarm handler in the core operating system space;
implementing an alarm dispatcher in the core operating system space that receives alarms and dispatch the alarms to one of the alarm handlers.

34. A method for operating a computer system, comprising the steps of:
implementing a core operating system;
providing a system space having a number of memory locations;
operating the core operating system to create a number of protection domains to partition the system space into a plurality of partitions and core operating system space; and
implementing a partition operating system and a partition user application pair in each partition, whereby the partition operating system, partition user application pairs of the partitions are spatially partitioned from each other;
operating each partition operating system of each pair to provide resource allocation services to the respective partition user application within the partition;
operating the core operating system to schedule the partitions such that the partition operating system, partition user application pairs are temporally partitioned from each other;
implementing a partition alarm handler in each partition and a system alarm handler in the core operating system space;
implementing an alarm dispatcher in the core operating system space that receives alarms and dispatch the alarms to one of the alarm handlers.

35. A computer system, which comprises:
a core operating system; and
a system space having a number of memory locations;
the core operating system arranged to partition the system space into a plurality of partitions and a core operating system space; and
a partition operating system, a partition user application, and a partition alarm handler in each partition, each partition operating system providing resource allocation services to the respective partition user application within the partition;
an alarm dispatcher and a system alarm handler in the core operating system space, the alarm dispatcher configured to receive alarms and to dispatch the alarms to one of the alarm handlers.

36. A method for operating a computer system, comprising the steps of:
implementing a core operating system;
providing a system space having a number of memory locations;
operating the core operating system to partition the system space into a plurality of partitions and a core operating system space; and
implementing a partition operating system and a partition user application in each partition;
operating each partition operating system of each pair to provide resource allocation services to the respective partition user application within the partition;
implementing a partition alarm handler in each partition and a system alarm handler in the core operating system space;
implementing an alarm dispatcher in the core operating system space that receives alarms and dispatch the alarms to one of the alarm handlers.

37. The method of claim 36, wherein each partition is implemented as a protection domain.

38. A method for operating a computer system, comprising the steps of:
providing a system space having a number of memory locations, the system space including a plurality of partitions and an operating system space;

implementing a partition user application in each partition, whereby the partition user applications are spatially partitioned from each other;

operating an operating system to schedule the partitions such that the partition user applications are temporally partitioned from each other;

implementing a partition alarm handler in each partition and a system alarm handler in the core operating system space;

implementing an alarm dispatcher in the operating system space that receives alarms and dispatch the alarms to one of the alarm handlers;

wherein, if a first alarm is dispatched to one of the partition alarm handlers and said one of the partition alarm handlers is unable to clear the first alarm, said one of the partition alarm handlers generates a second alarm, and transmits the second alarm to the alarm dispatcher, and wherein the alarm dispatcher receives the second alarm and dispatches the second alarm to an alarm handler other than said one of the partition alarm handlers.

* * * * *